United States Patent [19]
Fukuzawa

[11] Patent Number: 5,854,688
[45] Date of Patent: Dec. 29, 1998

[54] IMAGE READING APPARATUS THAT CORRECTS THE OUTPUT OF LIGHT RECEIVING ELEMENT CORRESPONDING TO A PIXEL BASED ON OUTPUT VALUES OF LIGHT RECEIVING ELEMENTS CORRESPONDING TO SURROUNDING PIXELS

[75] Inventor: Nobumasa Fukuzawa, Yokohama, Japan

[73] Assignee: Canon Kabushiki Kaisha, Tokyo, Japan

[21] Appl. No.: 781,143

[22] Filed: Jan. 9, 1997

Related U.S. Application Data

[63] Continuation of Ser. No. 263,356, Jun. 21, 1994, abandoned.

[30]  Foreign Application Priority Data

Jun. 22, 1993 [JP] Japan ................................. 5-150629

[51] Int. Cl.⁶ ............................... H04N 1/40; H04N 1/04
[52] U.S. Cl. ........................... 358/296; 358/471; 358/483
[58] Field of Search ................................. 358/296, 471, 358/474, 475, 480, 482, 483, 494, 497

[56]  References Cited

U.S. PATENT DOCUMENTS

| | | | |
|---|---|---|---|
| 5,283,698 | 2/1994 | Fukuzawa et al. | 359/896 |
| 5,289,000 | 2/1994 | Toyofuku | 358/497 X |
| 5,412,201 | 5/1995 | Fukuzawa et al. | 250/208.1 |
| 5,414,536 | 5/1995 | Kobayashi | 358/480 X |
| 5,499,101 | 3/1996 | Watanabe | 358/296 |

*Primary Examiner*—Peter S. Wong
*Assistant Examiner*—Gregory J. Toatley, Jr.
*Attorney, Agent, or Firm*—Fitzpatrick, Cella, Harper & Scinto

[57]  ABSTRACT

An original reading apparatus includes a light source for illuminating an original, and a light receiver to receive light reflected from the original, the light receiver having a plurality of light receiving elements each for outputting an electric signal in accordance with an amount of received light. Output values of the light receiving elements are corrected corresponding to pixels on the original.

11 Claims, 6 Drawing Sheets

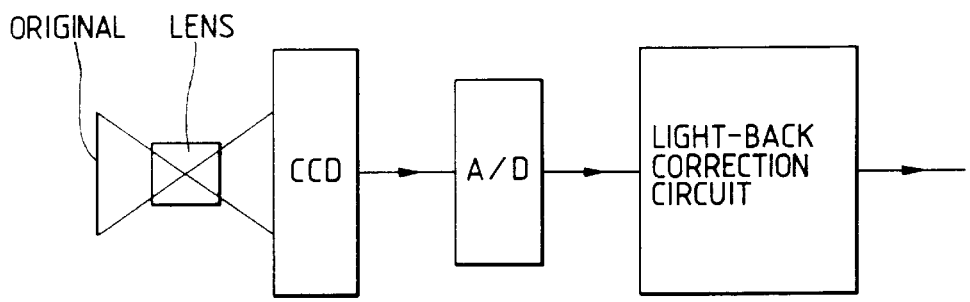
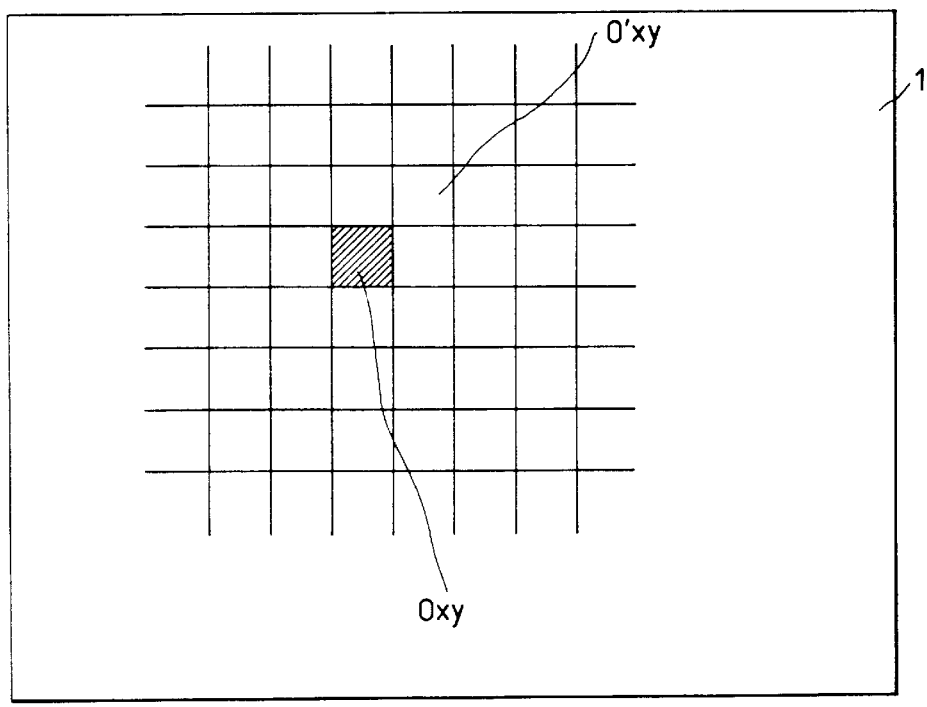

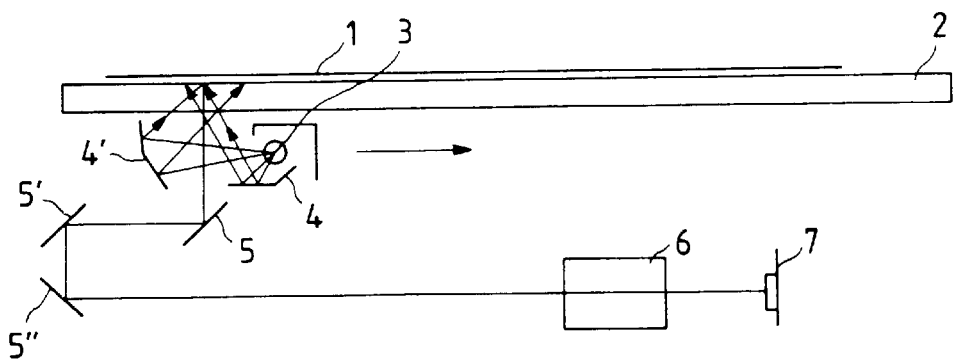
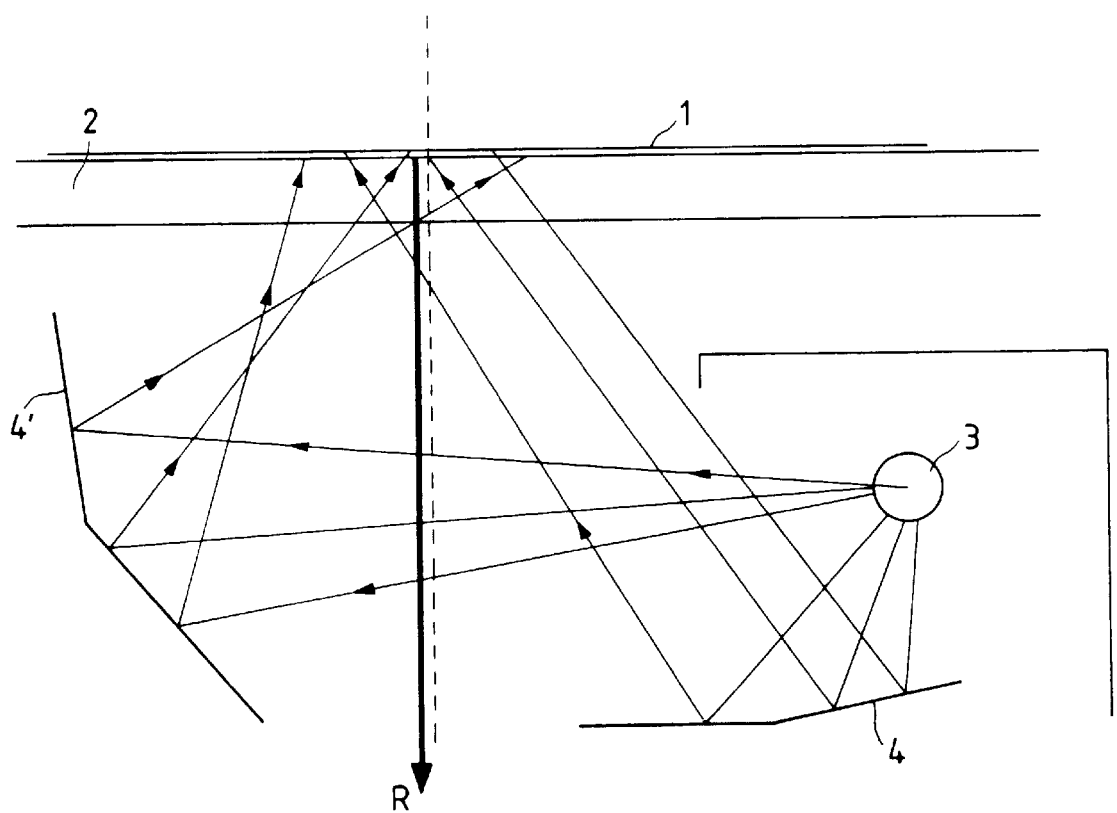

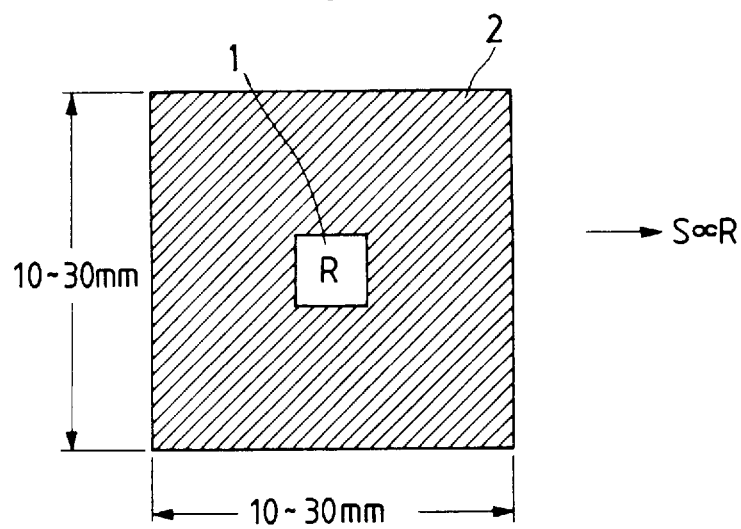
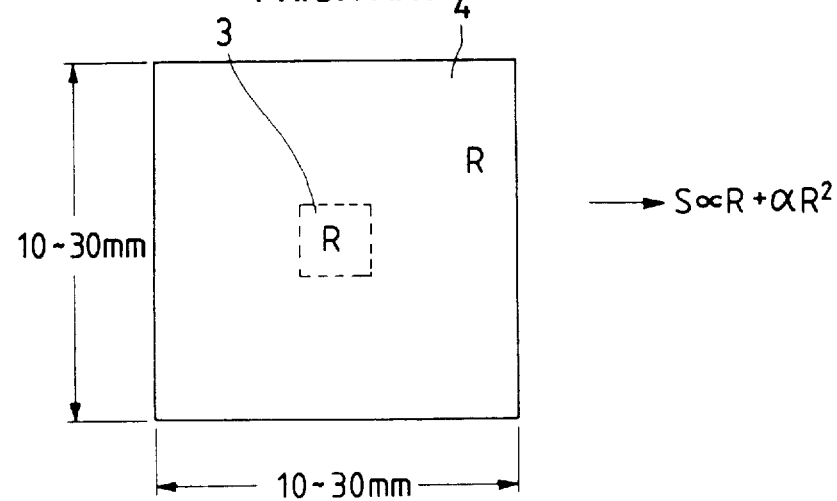

IMAGE READING APPARATUS THAT CORRECTS THE OUTPUT OF LIGHT RECEIVING ELEMENT CORRESPONDING TO A PIXEL BASED ON OUTPUT VALUES OF LIGHT RECEIVING ELEMENTS CORRESPONDING TO SURROUNDING PIXELS

This application is a continuation of application Ser. No. 08/263,356 filed Jun. 21, 1994 now abandoned.

BACKGROUND OF THE INVENTION

1. Field of the Invention

The present invention relates to an image reading apparatus for reading an original image in a digital manner by a line sensor such as a CCD, and an image forming apparatus using the image reading apparatus.

2. Related Background Art

For example, a typical image reading apparatus using a line sensor comprised of a plurality of light receiving elements arranged side by side is constituted as shown in FIGS. 2 and 3. FIG. 2 is a schematic view of the image reading apparatus, and FIG. 3 is an enlarged view of an illuminating system of the image reading apparatus. As shown in FIGS. 2 and 3, in such an apparatus, light emitted from an original illumination light source 3 is reflected by a reflection hood 4 and a reflection mirror 4' to be condensed on a surface of an original 1 rested on an original support 2 so that the original surface is illuminated by the light. The light reflected from the original is focused on a line sensor 7 by a focusing lens 6 through mirrors 5, 5', 5" to read image information on the original as a digital signal.

However, normally, the light is diffused by the original. As shown in FIG. 4B, a portion of the light diffused by the original is returned back to the illuminating system, and the original is illuminated again by the diffused light reflected by the reflection hood 4, reflection mirror 4' and the like. Accordingly, the light received by the line sensor includes not only the light (referred to as "primary light" hereinafter) emitted from the light source and reflected by the reflection hood 4 and reflection mirror 4' but also the light (referred to as "secondary light" hereinafter) diffused by the original and reflected again by the reflection hood 4 and reflection mirror 4' toward the original. This phenomenon is referred to as "light-back phenomenon" hereinafter.

That is to say, when the reflection rate of the original is R, the output S of the line sensor is not only proportional to the original reflection rate R but also influenced upon the high order of R, thereby establishing the following relation:

$$S \propto R + \alpha R^2 + \beta R^3 + \ldots$$

Where, S is output of the line sensor, $\alpha$ and $\beta$ are coefficients depending upon the illuminating system of the original reading apparatus, and R is reflection rate of the original.

Now, the following explanation will be made in consideration of the first and the second order (power), the orders having the greatest influence. That is to say, the above relation becomes as follows:

$$S \propto R + \alpha R^2$$

Where, $\alpha$ is a coefficient depending upon the illuminating system of the original reading apparatus, and, for example, $\alpha$ may be 0.1–0.15. Thus, the output of the sensor will be out of proportional relation with respect to the reflection rate R of the original, as shown in the solid line in FIG. 5.

Further, the outputs of the light receiving elements corresponding to two pixels on the original which have essentially the same reflection rate are differentiated from each other due to the light-back phenomenon. That is, as mentioned above, the light incident to the reading pixel includes not only the primary light but also the secondary light from peripheral pixels. Accordingly, even when the reading pixels on the original have the same reflection rate, if the peripheral pixels have a different reflection rate, since an amount of secondary light incident to one reading pixel differs from an amount of secondary light incident to the other reading pixel, the sensor output S regarding one reading pixel will be differentiated from the sensor output S regarding the other reading pixel.

For example, as shown in FIGS. 6A and 6B, even when the reading portions have the same reflection rate R, if the condition of the peripheral portion varies, the sensor output regarding one reading portion will differ from the sensor output regarding the other reading portion. In this case, if an attempt is made to reach the density of the original with high accuracy and high gradation, due to the above-mentioned light-back phenomenon, there will arise a problem that a non-linear relation between the reflection rate of the original and the sensor output, and the output of the reading pixel; depend upon the reflection rate of the peripheral portion.

To solve the above problem, it may be attempted to prevent the light diffused by the original is prevented from returning back to the reflection hood or the reflection mirror (i.e., $\alpha \approx 0$). In such a case, however, the reflection hood, or reflection mirror must be kept further away from the surface of the original, with the result that the illuminating system is made large-sized, thereby making the entire apparatus bulky. At the same time, since the light source is also kept further away from the original surface, the light amount is reduced considerably.

SUMMARY OF THE INVENTION

The present invention aims to eliminate the above-mentioned conventional drawbacks, and an object of the present invention is to provide an image reading apparatus and an image forming apparatus using such a reading apparatus, which can correctly read an image on an original.

Another object of the present invention is to provide an image reading apparatus and an image forming apparatus using such a reading apparatus, which have a correction means for correcting an output value of a light receiving element.

A further object of the present invention is to provide an image reading apparatus and an image forming apparatus using such a reading apparatus, which have a correction means for performing correction in consideration of a light-back phenomenon of an original illuminating means.

The other objects and features of the present invention will be apparent from the following detailed explanation referring to the accompanying drawings.

BRIEF DESCRIPTION OF THE DRAWINGS

FIG. 1A is a block diagram showing a construction of an original reading portion, and FIG. 1B is a view showing a condition that an image on an original is divided into many pixels;

FIG. 2 is a schematic sectional view of an image reading apparatus;

FIG. 3 is an enlarged view of an original illuminating portion of the image reading apparatus of FIG. 2;

FIG. 6A is a view showing a condition that density of a reading portion differs from density of a peripheral portion, and FIG. 6B is a view showing a condition that density of a reading portion is the same as density of a peripheral portion.

DETAILED DESCRIPTION OF THE PREFERRED EMBODIMENTS

Figure 4A:
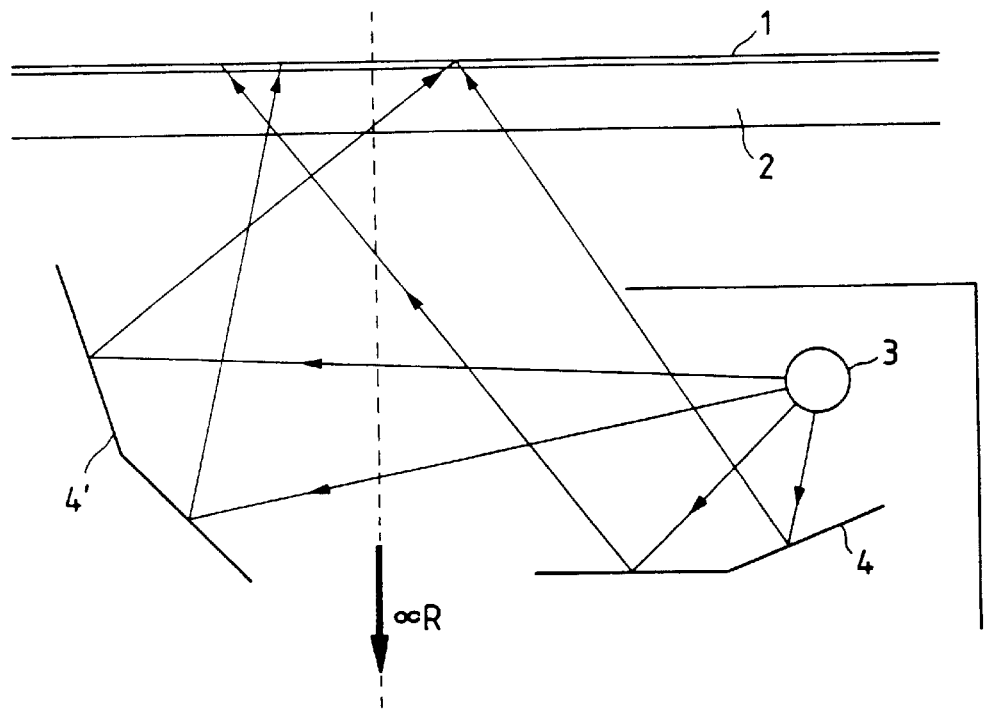
FIG. 4A is an explanatory view showing a condition that there is no light-back phenomenon in the original illuminating portion.
Figure 4B:
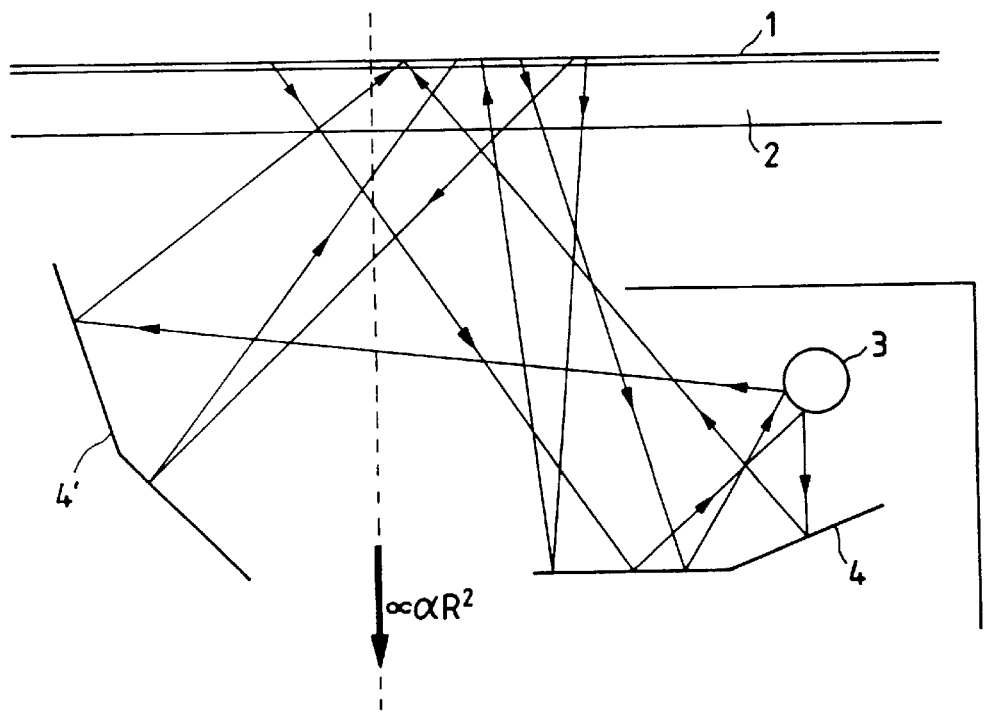
FIG. 4B is an explanatory view showing a condition that there is a light-back phenomenon in the original illuminating portion.
Figure 5:
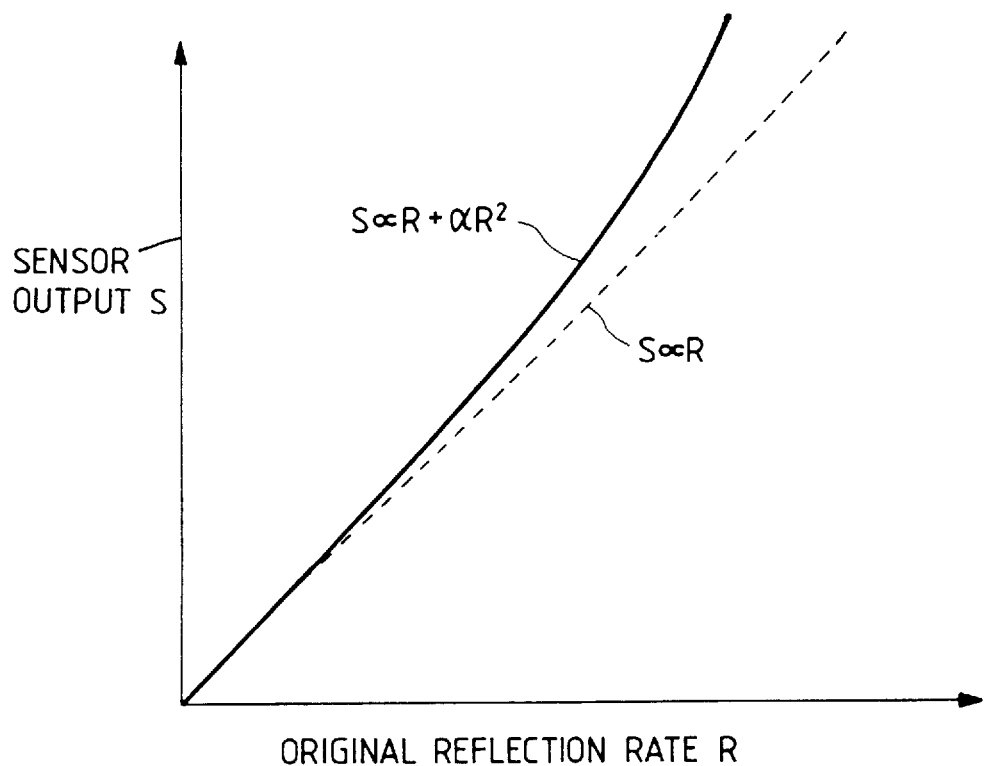
FIG. 5 is a graph showing a relation between an original reflection rate and an output of a light receiving sensor.
Figure 7:
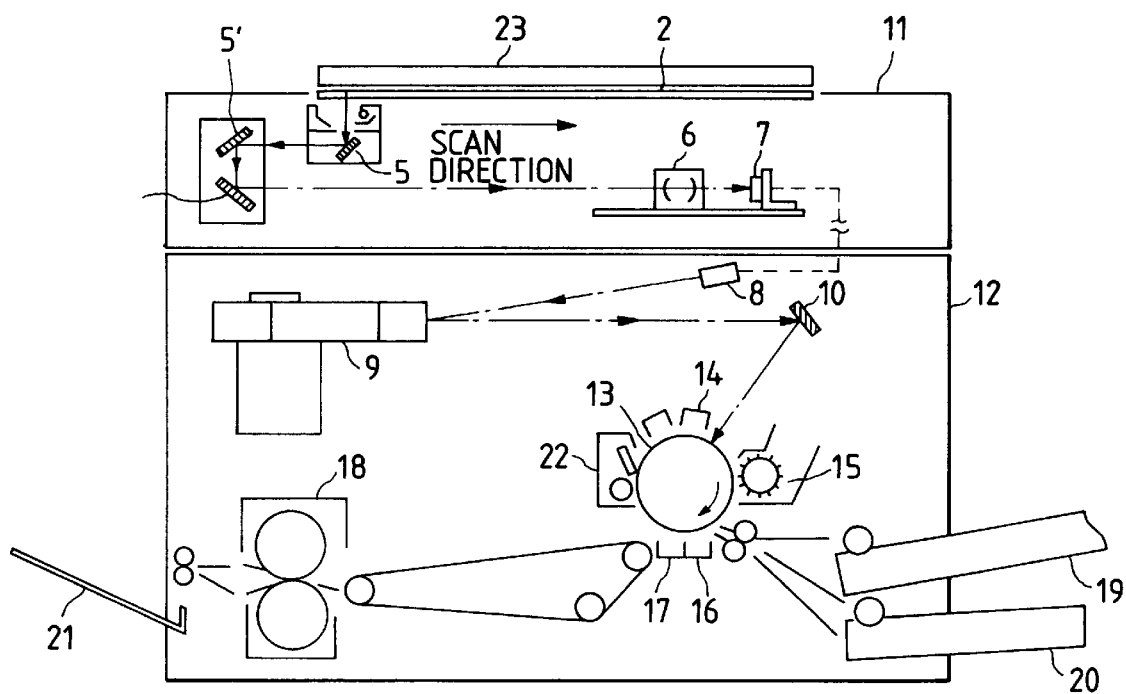
FIG. 7 is a schematic sectional view of an image forming apparatus having an image reading apparatus according to the present invention.

An image forming apparatus having an image reading apparatus according to the present invention is shown in FIG. 7. Incidentally, the same functional and structural elements as those described above are designated by the same reference numerals.

An image reading apparatus 11 is incorporated into an image forming apparatus 12. An original resting on an original support 2 is scanned in a scan direction in the same manner as described in relation to FIG. 2 and image information on the original is read by light receiving elements (CCD) 7 and is temporarily stored in a memory (not shown). In the image forming apparatus 12, laser light is emitted from a laser light source 8 in response to the image information stored in the memory. The laser light is deflected by a polygon mirror 9 and a reflection mirror 10 so that the laser light is illuminated onto a photosensitive drum 13. The photosensitive drum 13 is previously charged to a predetermined potential by means of a charger 14. When the photosensitive drum is illuminated by the laser light, an electrostatic latent image is formed on a surface of the photosensitive drum 13. The latent image is then developed with toner by means of a developing device is to form a toner image. The toner image is transferred, by a transfer charger 16, onto a sheet supplied from a sheet supply cassette 19 or 20. Then, the sheet is separated from the photosensitive drum 13 by a separation charger 17, and the separated sheet is sent to a fixing device 18 comprising a pair of rollers, where the toner image is fixed to the sheet while the sheet is being passed between the rollers. After the fixing operation, the sheet is discharged onto a discharge tray 21. On the other hand, after the transferring operation, the surface of the photosensitive drum 13 is cleaned by a cleaning device 22 for preparation for the next image formation.

Next, the feature of the present invention will be described concretely.

FIGS. 1A and 1B are referred to explain the present invention. FIG. 1A is a view showing the flow of the image information on the original, and FIG. 1B is a view showing a reading pixel read by any light receiving element and peripheral pixels surrounding the reading pixel.

In FIG. 1A, image light from the original is sent, through a lens, to a photoelectric convertor element (line sensor) such as CCD, where the image light is converted into an electric signal. The signal is A/D-converted by an A/D converter and then is sent to a light-back correction circuit associated with the present invention, where the signal is corrected to obtain an output for a reading portion. In the CCD, several thousands of light receiving elements are arranged in a direction perpendicular to the plane of FIG. 7.

Accordingly, when the original is read by shifting the light source 3, reflection hood 4, reflection mirror 4' and mirrors 5, 5', 5" in the scan direction shown in FIG. 7 at a predetermined speed, the image on the original is pixel-decomposed as shown in FIG. 1B to be read.

In the illustrated embodiment, as an example, a reading pixel to be read by any light receiving element is designated by Oxy and peripheral pixels are designated by O'xy as shown in FIG. 1B.

In the light-back correction according to the illustrated embodiment, when an output value of a light receiving element for receiving the reflected light from the reading pixel Oxy is Sxy and an output value of light receiving elements for receiving the reflected light from the peripheral pixels O'xy is S'xy, a correction value CSxy is calculated from the following equation:

$$CSxy = Sxy - \alpha \frac{\Sigma(Sxy \cdot S'xy)}{\Sigma nxy}$$

That is to say, $$CSxy = Sxy \left( 1 - \alpha \frac{\Sigma S'xy}{\Sigma nxy} \right) \quad (1)$$

Where, $\Sigma(Sxy \cdot S'xy)$ is sum of values obtained by multiplying the reading pixel Oxy by each peripheral pixel O'xy, and $\Sigma n$ is the number of the peripheral pixels. Incidentally, when the light receiving element receives the reflected light from a pixel having reflection rate of 100%, the output value S of such a light receiving element is 1 (S=1).

By using this correction equation, the output value of the light receiving element for receiving the reflected light from the reading pixel Oxy is closely approximated by the correction circuit as if it coincides with the output value obtained when such light receiving element receives only the primary reflected light.

That is to say, as is apparent from the above equation (1), when the peripheral portion 2 surrounding the reading pixel Oxy (located within reading portion 1) is completely black (FIG. 6A), i.e. when S'xy=0, since there is no influence of the secondary light from the peripheral pixels O'xy, the output value $Sxy_1$ before correction becomes the same as the output value CSxy after correction (CSxy=$Sxy_1$). On the other hand, when the peripheral portion 4 surrounding the reading pixel Oxy (located within reading portion 3) has the same reflection rate as the reading pixel Oxy (FIG. 6B), a relation between the output value $Sxy_2$ before correction and the output value CSxy after correction becomes as follows:

$$CSxy \approx Sxy_2 - \alpha S^2 xy_2 \approx Sxy_1$$

Thus, it is possible to remove the second order $\alpha R^2$ in FIG. 6B, and the output value from the reading pixel Oxy in FIG. 6A becomes the same as the output value from the reading pixel Oxy in FIG. 6B, which pixels have essentially the same reflection rate.

By effecting the correction in this way, a relation between the reflection rate Rxy of the pixel Oxy on the original and the corrected output signal CSxy exhibits linearity, i.e.

CSxy∝Rxy

Thus, in the illustrated embodiment, even when the illuminating system which generates the light-back phenomenon is used, it is possible to prevent the bad influence of the reflection of the pixel Oxy itself, thereby permitting the reading of the original with high accuracy and high gradation. Further, it is possible to solve the problem that the output of the light receiving element for receiving the reflected light from the pixel Oxy varies in accordance with the different reflection rate of the peripheral portion surrounding the pixel Oxy.

Incidentally, in the illustrated embodiment, since the coefficient a of the illuminating system has the value of the order of 0.1–0.15 ($\alpha \approx 0.1$–$0.15$), and, thus, the item of $\alpha^2$ becomes 0.01–0.02 ($\alpha^2 = 0.01$–$0.02$) which does not affect the influence substantially, such a value of $\alpha^2$ is neglected. However, in the illustrated embodiment, it is more preferable that the image is read with higher accuracy by effecting the correction in consideration of the high orders of $\alpha$.

Further, it should be noted that the area and number of the peripheral pixels used in the correction according to the illustrated embodiment can be appropriately selected. Furthermore, the output correction may be effected in consideration of a predetermined number of pixels at a time, as well as a single pixel.

Next, a second embodiment of the present invention will be explained.

In the aforementioned embodiment, while the correction was effected by using the average value of the sum of values obtained by multiplying the pixel Oxy by each peripheral pixel O'xy, strictly speaking, since the influence of the light-back phenomenon also depends upon a distance between the reading pixel Oxy and the peripheral pixel O'xy, it is more preferable that the weighting is adopted with the coefficient a having the dependency as follows:

$$CS'xy = Sxy - \frac{\Sigma \alpha xy (Sxy \cdot S'xy)}{\Sigma n} \quad (2)$$

Where, $\alpha xy$ is coefficient of light-back depending upon a distance between the reading pixel Oxy and the peripheral pixel O'xy. By doing so, it is possible to effect the light-back correction with higher accuracy.

In the above-mentioned first and second embodiments, in order to reduce the number of image memories used in the correction, the original may be pre-scanned to seek the average output value per area (for example, 10 mm×10 mm areas or 20 mm×20 mm areas divided on the original) and the correction circuit may be designed by assuming that each area has uniform reflection rate.

As mentioned above, according to the present invention, since the correction circuit is provided for correcting the output values of the light receiving elements corresponding to various pixels (or areas), the bad influence of the secondary light generated by the reflection from the reading pixel (or area) itself can be prevented, thereby permitting the reading of the original with high accuracy and high gradation. Further, it can be prevented that, when the light receiving element receives the light from the reading pixel (or area), the output of the light receiving element varies from the output value which should be essentially obtained, due to the change in the reflection rate or image density of the peripheral portion.

Incidentally, in the aforementioned embodiments, while an example that the output values from the light receiving elements are directly corrected was explained, in the present invention, after the image information of the original read by the line sensor is converted into digital image data, for example, the image data read by the line sensor may be corrected in accordance with the present invention to correct the information including the light-back phenomenon, thereby obtaining the completely linear image data.

Further, the present invention is not limited to the monocolor (white and black) digital reading system, but may be applied to any color image reading systems. In this case, for example, the light-back correction can be effected for each color component (R, G, B).

The present invention is not limited to the illustrated embodiments, but various alterations and modifications can be effected within the scope of the invention.

What is claimed is:

1. An original reading apparatus comprising:

a light source for illuminating an original;

a light receiving means for receiving light reflecting from the original, said light receiving means having a plurality of light receiving elements each outputting an electric signal in accordance with an amount of received light; and correction means for correcting respective output values of light receiving elements corresponding to each pixel on the original, wherein when the output value of a respective one of said light receiving elements corresponding to any one pixel on the original is Sxy and an output value of light receiving elements corresponding to peripheral pixels surrounding said any one pixel is S'xy, said correction means calculates a correction value CSxy in accordance with the following equation:

$$CSxy = Sxy \left(1 - \alpha \frac{\rho S'xy}{\Sigma nxy}\right)$$

where, $\alpha$ is a constant and $\Sigma nxy$ is a sum of the peripheral pixels.

2. An original reading apparatus according to claim 1, further comprising a reflection hood for reflecting light emitted from said light source toward the original, and a reflection mirror for reflecting light from said reflection hood toward the original.

3. An original reading apparatus according to claim 2, wherein said light source, said reflection hood and said reflection mirror are shifted in parallel with a surface of the original.

4. An original reading apparatus according to claim 1, wherein said plurality of light receiving elements are arranged in parallel with said light source.

5. An original reading apparatus according to claim 1, wherein said constant $\alpha$ has a value of 0.1–0.15.

6. An image forming apparatus comprising:

a light source for illuminating an original;

a light receiving means for receiving light reflected from the original, said light receiving means having a plurality of light receiving elements each outputting an electric signal in accordance with an amount of received light;

correction means for correcting respective output values of light receiving elements corresponding to pixels on the original; and image forming means for forming an image on a recording material on the basis of a value corrected by said correction means;

wherein when the output value of a respective one of said light receiving elements corresponding to any one pixel on the original is Sxy and an output value of light receiving elements corresponding to peripheral pixels surrounding said any one pixel is S'xy, said correction means calculates a correction value CSxy in accordance with the following equation:

$$CSxy = Sxy\left(1 - \alpha\frac{\rho S'xy}{\Sigma nxy}\right)$$

where, $\alpha$ is a constant and $\Sigma nxy$ is a sum of the peripheral pixels.

7. An image forming apparatus according to claim 6, wherein said image forming means comprises a photosensitive body, and a laser light source for illuminating laser light including image information based on said correction value CSxy onto said photosensitive body.

8. An original reading apparatus comprising:

a light source for illuminating an original;

a light receiving means for receiving light reflecting from the original, said light receiving means having a plurality of light receiving elements each outputting an electric signal in accordance with an amount of received light; and correction means for correcting respective output values of light receiving elements corresponding to each pixel on the original, wherein said correction means corrects the output value of said light receiving elements corresponding to a reading pixel of the original in accordance with an output value of light receiving elements corresponding to peripheral pixels surrounding the reading pixel.

9. An original reading apparatus according to claim 8, further comprising a reflection hood for reflecting light emitted from said light source toward the original, and a reflection mirror for reflecting light from said reflection hood toward the original.

10. An original reading apparatus according to claim 9, wherein said light source, said reflection hood and said reflection mirror are shifted in parallel with a surface of the original.

11. An original reading apparatus according to claim 8, wherein said plurality of light receiving elements are arranged in parallel with said light source.

* * * * *

UNITED STATES PATENT AND TRADEMARK OFFICE
CERTIFICATE OF CORRECTION

PATENT NO. : 5,854,688

DATED : December 29, 1998

INVENTOR(S) : NOBUMASA FUKUZAWA

Page 1 of 2

It is certified that error appears in the above-identified patent and that said Letters Patent is hereby corrected as shown below:

Title page, item
[54] TITLE, and col. 1,

"ELEMENT" should read --ELEMENTS--.

COLUMN 1

Line 3, "ELEMENT" should read --ELEMENTS--.

COLUMN 2

Line 18, "reach" should read --read--.
Line 22, "pixel;" should read --pixel,--.
Line 25, "is prevented" should be deleted.

COLUMN 3

Line 38, "is" should read --15--.
Line 53, "referred to" should read --referred to to--.

COLUMN 5

Line 5, "coefficient a" should read --coefficient $\alpha$--.
Line 27, "coefficient a" should read --coefficient $\alpha$--.

UNITED STATES PATENT AND TRADEMARK OFFICE
CERTIFICATE OF CORRECTION

PATENT NO. : 5,854,688

DATED : December 29, 1998

INVENTOR(S) : NOBUMASA FUKUZAWA

It is certified that error appears in the above-identified patent and that said Letters Patent is hereby corrected as shown below:

<u>COLUMN 6</u>

Line 27,

"$CSxy = Sxy \left(1 - \alpha \frac{\rho S'xy}{\Sigma nxy}\right)$" should read

-- "$CSxy = Sxy \left(1 - \alpha \frac{\Sigma S'xy}{\Sigma nxy}\right)$ --.

<u>COLUMN 7</u>

Line 2,

"$CSxy = Sxy \left(1 - \alpha \frac{\rho S'xy}{\Sigma nxy}\right)$" should read

-- "$CSxy = Sxy \left(1 - \alpha \frac{\Sigma S'xy}{\Sigma nxy}\right)$ --.

Signed and Sealed this

Eighth Day of February, 2000

Attest:

*Attesting Officer*

Q. TODD DICKINSON

*Commissioner of Patents and Trademarks*